V. H. JENNINGS.
MACHINE GUN BELT AND THE LIKE.
APPLICATION FILED MAY 1, 1917.
1,346,207. Patented July 13, 1920.
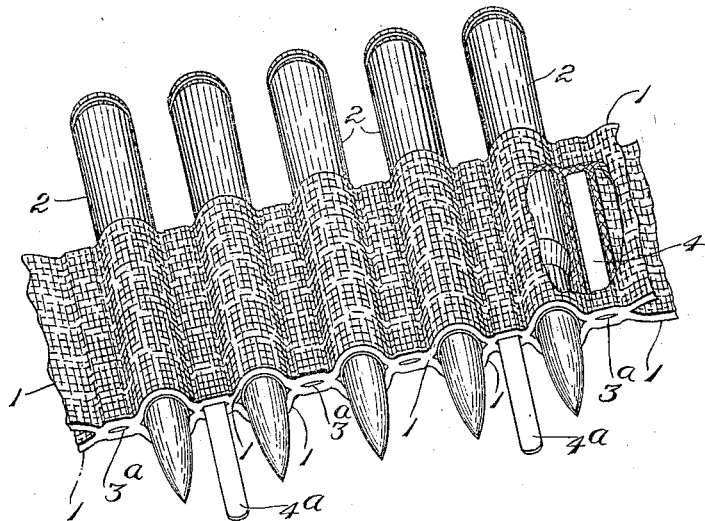
Fig. 1.
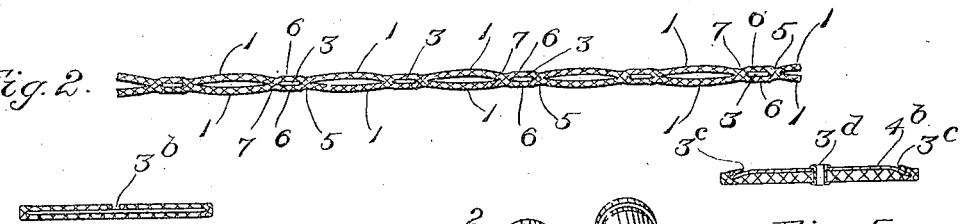
Fig. 2.
Fig. 4.      Fig. 5.
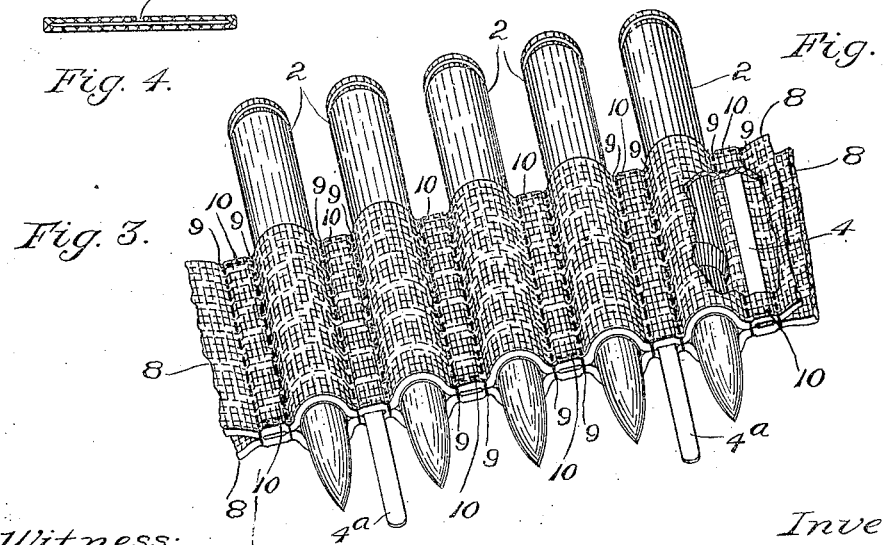
Fig. 3.
Witness:
Oscar F. Hill
Inventor:
Victor H. Jennings
by Chas. F. Randall
Attorney.

UNITED STATES PATENT OFFICE.

VICTOR H. JENNINGS, OF WORCESTER, MASSACHUSETTS, ASSIGNOR TO UNIVERSAL PATENTS COMPANY, OF WOONSOCKET, RHODE ISLAND, A CORPORATION OF RHODE ISLAND.

MACHINE-GUN BELT AND THE LIKE.

1,346,207.  Specification of Letters Patent.  Patented July 13, 1920.

Application filed May 1, 1917.  Serial No. 165,666.

*To all whom it may concern:*

Be it known that I, VICTOR H. JENNINGS, a citizen of the United States, residing at Worcester, in the county of Worcester, State of Massachusetts, have invented a certain new and useful Improvement in Machine-Gun Belts and the like, of which the following is a specification, reference being had therein to the accompanying drawings.

The invention is an improvement in machine-gun belts and other carriers of the same general character and construction as those used as machine-gun belts. It provides in novel and improved manner for the combination with such belts or carriers of means for stiffening or reinforcing them transversely, as well as for the combination therewith of laterally projecting "guides" on the order of those with which machine-gun belts usually are provided. It provides for the employment of stiffening means and guides of simpler and less expensive character than those heretofore employed. It lessens the manufacturing cost.

The invention is applicable in the case of belts or carriers of two classes known in the art. The first of these classes comprises belts or carriers of the type composed of two plies constituted by two strips or webbings laid together face to face and fastened together at intervals on transverse lines, leaving between the two strips or webbings, intermediate the transverse lines of fastenings, transverse openings or loops adapted to contain the cartridges or other intended articles. The other of the said classes comprises belts or carriers of the type composed of a web woven in separated plies at intervals so as to form the transversely extending loops for the reception of cartridges or other articles, and having such plies joined together and united in the weaving between one loop or pocket and the next so as to form the division between the successive pockets.

In practice, in the case of belts or carriers of the first class referred to, the fastenings comprise strips of metal, called clips, extending crosswise of the strips or webbings in pairs, one metal strip or clip of a pair at one side of the two strips or webbings and the other thereof at the opposite side of the latter, with the two metal strips or clips of a pair bound together by rivets, usually eyelets. At regular intervals a pair of the metal strips or clips projects beyond one edge of the belt or carrier to serve as a "guide" in guiding the charged belt or carrier through a machine-gun. The metal strips or clips stiffen or reinforce the belt or carrier transversely so that it will not cripple or yield transversely when the cartridges are being pushed home within the loops into which they are inserted in loading the belt or carrier. Similar metal strips or clips are appled to belts or carriers of the second class referred to, to stiffen or reinforce a belt or carrier transversely and furnish it with the so-called guides. The cost of the metal strips or clips and the eyelets, and the expense incident to applying the said strips or clips, increase considerably the cost of belts or carriers made as heretofore.

The invention consists, essentially, in a belt or carrier having transverse loops for the reception of cartridges or other articles, and formed between the successive loops with transversely extending pockets or tubes containing reinforcing or stiffener-strips. Two different embodiments of the invention are shown in the drawings, in which latter,—

Figure 1 is a perspective view showing a portion of the length of a machine-gun belt or carrier of the second class mentioned above, embodying the invention, with cartridges occupying the loops thereof. A small portion of the woven fabric is represented as broken away, to show a reinforcing or stiffener-strip.

Fig. 2 is a longitudinal section of the said portion, without any cartridges.

Fig. 3 is a perspective view showing a portion of the length of a machine-gun belt or carrier of the first of the classes mentioned above.

Figs. 4 and 5 are cross-sectional views showing modifications of the belt or carrier of Figs. 1 and 2.

Referring first to the embodiment of the invention in machine-gun belts or carriers of the class or type illustrated by Figs. 1 and 2, comprising an integral web woven at intervals in separated plies 1, 1, so as to form between such plies the transversely extending loops for the reception of cartridges 2, 2:—In carrying the invention into effect, the divisions between the said loops, formed by joining the said plies together and uniting them in the weaving, are woven so as to provide transversely extending pockets or tubes 3, 3, Fig. 2, for reinforcing or stiffener-strips 4, 4ᵃ, Fig. 1. To provide for the convenient insertion of the reinforcing or stiffener-strips, and to enable the longer strips 4ᵃ, constituting the guides, to project from such edge, the said pockets or tubes usually will have openings 3ᵃ, 3ᵃ, at one edge of the belt or carrier. Preferably the pockets or tubes are closed at the other edge of the belt or carrier to prevent displacement of the reinforcing or stiffener-strips beyond such edge. A belt or carrier such as that shown in Figs. 1 and 2 is produced by weaving the plies 1, 1, separate from each other to form a cartridge-receiving loop, then binding the two plies together in the weaving at 5 crosswise of the web to close the said loop at one side thereof, then weaving separate plies 6, 6, to form a stiffener-receptacle or tube but uniting them in the weaving along one edge of the web as indicated above, then binding the plies together in the weaving at 7 crosswise of the web to close the said receptacle or tube, then weaving separate plies 1, 1, to form a second cartridge-receiving loop, and so on. This mode of weaving produces a belt or carrier web woven at intervals in two plies which are separated for the insertion of cartridges, and between the cartridge-receiving loops woven with divisions having open-ended receptacles or tubes for the insertion of stiffening or reinforcing strips.

The reinforcing or stiffener-strips may be of any suitable and approved material, although in practice strips of walohn are preferred. Walohn, so-called, is steel coated with rubber. The strips ordinarily will be proportioned to fit snugly and tightly in their respective receptacles or tubes in the web of a belt or carrier. In some cases the frictional hold of the walls of such receptacles or tubes upon the strips may be depended upon to hold the strips from displacement outward through the openings of the receptacles or tubes. Fastenings or securing means may be employed, if deemed or found desirable. In the present instance, the openings 3ᵃ, 3ᵃ, along one edge of the belt or carrier are a little smaller in cross-section than the receptacles or tubes, so as to close partly against the end of an inserted strip, to prevent the latter from working endwise outward. The receptacles or tubes for the short strips intermediate the long ones serving as guides may be closed at both ends as shown in Fig. 4, with an intermediately located slit 3ᵇ for the insertion of a strip 4. Or slits 3ᶜ, 3ᶜ, may be provided near opposite margins of the belt or carrier for the opposite ends of a short strip, 4ᵇ, as in Fig. 5. The exposed portion of the length of such strip 4ᵇ may be fastened down by means of an eyelet 3ᵈ or other fastening.

Referring to Fig. 3, illustrating a machine-gun belt or carrier of the class or type comprising two strips or webbings laid together face to face and fastened together at intervals on transverse lines, leaving between the two strips or webbings transverse openings or loops adapted to contain the cartridges:—In this view, the invention is shown carried into effect by fastening the two strips or webbings 8, 8, together between one cartridge-receiving loop and the next by two transverse lines 9, 9, of fastenings, in this instance stitches, such lines being separated by a space sufficient to receive a reinforcing or stiffener-strip, as 4, 4ᵃ, providing thereby the receptacle or tube for the latter. The receptacles or tubes may be closed at the upper edge of the belt or carrier in Fig. 3 by supplemental stitches 10, and also at the opposite ends of the short intermediate strips 4. The two strips or webbings of Fig. 3 constitute in effect two plies, although they are not united with each other in the weaving as in the case of the two plies of the web shown in Figs. 1 and 2.

The belt or carrier may be beaded, as usual, along the edge thereof at which the guides project, if desired. The beading is omitted from the drawings hereof for convenience in illustration.

What is claimed as the invention is:—

1. A belt or carrier having transverse loops for the reception of cartridges or other articles, and formed between the successive loops with transversely extending pockets or tubes containing reinforcing or stiffener-strips and also formed in the weaving at opposite ends of said pockets or tubes to prevent endwise displacement of said strips.

2. A belt or carrier composed of two plies which are separate at intervals to form transversely extending loops adapted to contain cartridges or other articles, and between such loops joined together, with the formation of transversely extending stiffener-receptacles or tubes closed at one end thereof having mouths smaller in cross-section than the said stiffener-receptacles or tubes themselves, and having reinforcing or stiffener-strips occupying such receptacles or tubes.

3. A belt or carrier having transverse loops for the reception of cartridges or other articles, and formed between the successive loops with transversely extending pockets or tubes containing reinforcing or stiffener-strips closed at one end thereof and having mouths smaller in cross-section than the said pockets or tubes themselves certain of said strips projecting from said pockets or tubes and adapted to serve as guides.

4. A belt or carrier composed of two plies which are separated at intervals to form transversely extending loops adapted to contain cartridges or other articles, and between such loops joined together, with the formation of transversely extending stiffener-receptacles or tubes woven closed at one end thereof having mouths smaller in cross-section than the said stiffener-receptacles or tubes themselves, and having reinforcing or stiffener-strips occupying such receptacles or tubes, certain of said strips projecting from said pockets or tubes and adapted to serve as guides.

5. A belt or carrier comprising an integral web woven at intervals in separated plies to form transversely extending loops for the reception of cartridges or other articles, and having in alternation with such loops divisions formed by uniting said plies in the weaving, with the said divisions woven with transversely extending receptacles or tubes, and reinforcing or stiffener-strips occupying the said receptacles or tubes and held in place by the formation of the latter without the aid of rivets or the like.

6. A belt or carrier comprising an integral web woven at intervals in separated plies to form transversely extending loops for the reception of cartridges or other articles, and having in alternation with such loops divisions formed by uniting said plies in the weaving, with the said divisions woven with transversely extending receptacles or tubes, and reinforcing or stiffener-strips occupying the said receptacles or tubes, and held in place by the formation of the latter without the aid of rivets or the like, certain of said strips projecting from said receptacles or tubes and adapted to serve as guides.

In testimony whereof I affix my signature in presence of two witnesses.

VICTOR H. JENNINGS.

Witnesses:
ELVA M. LORD,
EMMA M. BAILEY.

It is hereby certified that Letters Patent No. 1,346,207, granted July 13, 1920, upon the application of Victor H. Jennings, of Worcester, Massachusetts, for an improvement in "Machine-Gun Belts and the like," were erroneously issued to "Universal Patents Company, of Woonsocket, Rhode Island," whereas said Letters Patent should have been issued to *Frank R. Batchelder, of Worcester, Massachusetts*, said Batchelder being assignee, *by mesne assignments*, of the entire interest in said invention, as shown by the records of assignments in this office; and that the said Letters Patent should be read with this correction therein that the same may conform to the record of the case in the Patent Office.

Signed and sealed this 22d day of February, A. D., 1921.

[SEAL.]

L. B. MANN,

*Acting Commissioner of Patents.*

Cl. 89—35.